US011872560B2

(12) United States Patent
Smith et al.

(10) Patent No.: US 11,872,560 B2
(45) Date of Patent: Jan. 16, 2024

(54) MICROFLUIDIC CHIPS FOR PARTICLE PURIFICATION AND FRACTIONATION

(71) Applicant: International Business Machines Corporation, Armonk, NY (US)

(72) Inventors: Joshua T. Smith, Croton on Hudson, NY (US); Stacey M. Gifford, Fairfield, CT (US); Sung-Cheol Kim, New York, NY (US); Benjamin H. Wunsch, Mt. Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 17/132,849

(22) Filed: Dec. 23, 2020

(65) Prior Publication Data
US 2021/0114028 A1 Apr. 22, 2021

Related U.S. Application Data

(62) Division of application No. 15/875,905, filed on Jan. 19, 2018, now Pat. No. 10,946,380.

(51) Int. Cl.
B01L 3/00 (2006.01)
G01N 1/40 (2006.01)
G01N 1/34 (2006.01)

(52) U.S. Cl.
CPC ...... B01L 3/502753 (2013.01); G01N 1/4077 (2013.01); B01L 2200/0647 (2013.01);
(Continued)

(58) Field of Classification Search
CPC ....... B01L 3/502753; B01L 2200/0652; B01L 2200/0647; G01N 1/4077
See application file for complete search history.

(56) References Cited

U.S. PATENT DOCUMENTS 8,021,614 B2    9/2011  Huang et al.
8,906,322 B2   12/2014  Huang et al.
(Continued)

FOREIGN PATENT DOCUMENTS

CN    101217118 A    7/2008
CN    101340836 A    1/2009
(Continued)

OTHER PUBLICATIONS

Notice of Allowance received for U.S. Appl. No. 17/227,522 dated Dec. 23, 2022, 7 pages.
(Continued)

Primary Examiner — Brian J. Sines
(74) Attorney, Agent, or Firm — Amin, Turocy & Watson, LLP

(57) ABSTRACT

Microfluid chips that comprise one or more microscale and/or mesoscale condenser arrays, which can facilitate particle purification and/or fractionation, are described herein. In one embodiment, an apparatus can comprise a layer of a microfluidic chip. The layer can comprise an inlet that can receive fluid, an outlet that can output a purified version of the fluid, and a condenser array coupled between and in fluid communication with the inlet and the outlet. The condenser array can comprise a plurality of pillars arranged in a plurality of columns. Also, a pillar gap sized to facilitate a throughput rate of the fluid of greater than or equal to about 1.0 nanoliter per hour can be located between a first pillar of the plurality of pillars in a first column of the plurality of columns and a second pillar of the plurality of pillars in the first column.

9 Claims, 10 Drawing Sheets

(52) U.S. Cl.
CPC ............... *B01L 2200/0652* (2013.01); *B01L 2300/0809* (2013.01); *B01L 2300/0816* (2013.01); *B01L 2300/0861* (2013.01); *B01L 2300/0864* (2013.01); *B01L 2300/1894* (2013.01); *G01N 1/34* (2013.01)

(56) References Cited

U.S. PATENT DOCUMENTS

| | | | |
|---|---|---|---|
| 9,636,675 | B2 | 5/2017 | Astier et al. |
| 9,700,891 | B2 | 7/2017 | Smith et al. |
| 9,835,538 | B2 | 12/2017 | Astier et al. |
| 10,324,011 | B2 | 6/2019 | D'Silva et al. |
| 11,149,298 | B2 | 10/2021 | Gifford et al. |
| 11,566,982 | B2 | 1/2023 | Wunsch et al. |
| 2006/0144076 | A1 | 7/2006 | Daddis et al. |
| 2007/0020496 | A1 | 1/2007 | Pelton et al. |
| 2009/0212407 | A1 | 8/2009 | Foster et al. |
| 2010/0059414 | A1 | 3/2010 | Sturm et al. |
| 2010/0200992 | A1 | 8/2010 | Purushothaman et al. |
| 2012/0037544 | A1 | 2/2012 | Lane et al. |
| 2013/0168298 | A1 | 7/2013 | Huang et al. |
| 2014/0154703 | A1 | 6/2014 | Skelley et al. |
| 2015/0054149 | A1 | 2/2015 | Purushothaman et al. |
| 2015/0064153 | A1 | 3/2015 | Civin et al. |
| 2015/0190804 | A1 | 7/2015 | Pesaturo et al. |
| 2016/0047735 | A1 | 2/2016 | Grisham et al. |
| 2016/0061811 | A1 | 3/2016 | Kelley et al. |
| 2016/0121331 | A1 | 5/2016 | Kapur et al. |
| 2016/0139012 | A1 | 5/2016 | D'Silva et al. |
| 2016/0144361 | A1 | 5/2016 | Astier et al. |
| 2016/0144405 | A1 | 5/2016 | Astier et al. |
| 2016/0144406 | A1 | 5/2016 | Astier et al. |
| 2016/0146717 | A1 | 5/2016 | Astier et al. |
| 2016/0146718 | A1 | 5/2016 | Astier et al. |
| 2016/0244714 | A1 | 8/2016 | Spuhler et al. |
| 2017/0248508 | A1 | 8/2017 | Ward et al. |
| 2017/0312747 | A1 | 11/2017 | Hu et al. |
| 2018/0078939 | A1 | 3/2018 | Hu et al. |
| 2018/0080060 | A1 | 3/2018 | Gifford et al. |
| 2018/0080857 | A1 | 3/2018 | Gifford et al. |
| 2019/0126278 | A1 | 5/2019 | Arai |
| 2019/0224677 | A1 | 7/2019 | Smith et al. |
| 2019/0226953 | A1 | 7/2019 | Wunsch et al. |
| 2020/0038861 | A1 | 2/2020 | Yoon et al. |
| 2020/0122144 | A1 | 4/2020 | Smith et al. |
| 2020/0139370 | A1 | 5/2020 | Kapur et al. |

FOREIGN PATENT DOCUMENTS

| | | |
|---|---|---|
| CN | 102052803 A | 5/2011 |
| CN | 102856329 A | 1/2013 |
| CN | 105050718 A | 11/2015 |
| CN | 105161473 A | 12/2015 |
| CN | 105293428 A | 2/2016 |
| CN | 105745021 A | 7/2016 |
| CN | 107110765 A | 8/2017 |
| EP | 2119503 A2 | 11/2009 |
| JP | H0926283 A | 1/1997 |
| JP | 2008-538282 A | 10/2008 |
| JP | 2008-538283 A | 10/2008 |
| JP | 2017-536824 A | 12/2017 |
| WO | 2017/087940 A1 | 5/2017 |
| WO | 2017/221898 A1 | 12/2017 |

OTHER PUBLICATIONS

Notice of Reasons for Refusal received for Japanese Patent Application Serial No. 2020-538856 dated Jan. 10, 2023, 6 pages (Including English Translation).
Chinese Office Action for Chinese Application Serial No. 201980008769.9 dated Feb. 12, 2023.
Final Office Action received for U.S. Appl. No. 15/875,940 dated Jul. 13, 2021, 18 pages.
Office Action received for G.B. Patent Application Serial No. 2010161.4 dated Nov. 4, 2021, 5 pages.
Office Action received for G.B. Patent Application Serial No. 2010161.4 dated Jan. 19, 2022, 3 pages.
Office Action received for G.B. Patent Application Serial No. 2010486.5 dated Jan. 24, 2022, 4 pages.
Office Action received for G.B. Patent Application Serial No. 2011413.8 dated Feb. 22, 2022, 4 pages.
Notice of Reasons for Refusal received for Japanese Patent Application Serial No. 2020-538794 dated Apr. 26, 2022, 10 pages.
Notice of Reasons for Refusal received for Japanese Patent Application Serial No. 2020-538856 dated May 10, 2022, 6 pages.
Smith, et al. "Microfluidic Devices With Multiple Inlets and Outlets." U.S. Appl. No. 16/168,330, filed Oct. 23, 2018. 39 pages.
Smith, et al. "Microfluidic Chips With One or More Vias Filled With Sacrificial Plugs." U.S. Appl. No. 16/168,292, filed Oct. 23, 2018. 17 pages.
Zhao, et al., Microfluidic Techniques for Analytes Concentration, Micromachines, Jan. 22, 2017, 32 Pages, vol. 8, No. 28.
Salafi, et al., Advancements in microfluidics for nanoparticle separation, Lab on a Chip, Oct. 26, 2016, pp. 11-33 , vol. 17, No. 11.
Wunsch, et al., Nanoscale lateral displacement arrays for the separation of exosomes and colloids down to 20 nm, Nature Nanotechnology, Aug. 1, 2016, pp. 936-940, vol. 11.
Contreras-Naranjo, et al., Microfluidics for exosome isolation and analysis: enabling liquid biopsy for personalized medicine, Lab on a Chip, Aug. 7, 2017, pp. 3558-3577, vol. 17, No. 21.
Woo, et al., Exodisc for rapid, size-selective, and efficient isolation and analysis of nanoscale extracellular vesicles from biological samples, ACS Nano, Jan. 9, 2017, pp. 1360-1370, vol. 11, No. 2.
Liu, et al., Field-free isolation of exosomes from extracellular vesicles by microfluidic viscoelastic flows, ACS Nano, Jul. 5, 2017, pp. 6968-6976, vol. 11, No. 7.
Liu, et al., The exosome total isolation chip, ACS Nano, Nov. 1, 2107, pp. 10712-10723, vol. 11.
Kim, et al., Broken flow symmetry explains the dynamics of small particles in deterministic lateral displacement arrays, PNAS, Jun. 12, 2017, pp. E5034-5041, vol. 114, No. 26.
Loutherback, et al., Improved performance of deterministic lateral displacement arrays with triangular posts, Microfluid Nanofluid, May 12, 2010, pp. 1143-1149, vol. 9.
Laki, et al., Microvesicle fractionation using deterministic lateral displacement effect, Proceedings of the 9th IEEE International Conference on Nano/Micro Engineered and Molecular Systems (NEMS), Apr. 13, 2014, pp. 490-493.
Laki, et al., Separation of Microvesicles from Serological Samples Using Deterministic Lateral Displacement Effect, BioNanoScience, 2015, pp. 48-54, vol. 5, No. 1.
Tran, et al., Open channel deterministic lateral displacement for particle and cell sorting, Lab on a Chip , Sep. 18, 2107, pp. 3592-3600, vol. 17, No. 21.
Yuan, et al., On-Chip Microparticle and Cell Washing Using Coflow of Viscoelastic Fluid and Newtonian Fluid, Analytical Chemistry, Aug. 8, 2007, 10 Pages.
Wang, et al., Ciliated micropillars for the microfluidic-based isolation of nanoscale lipid vesicles, Lab on a Chip, May 7, 2003, pp. 2879-2882, vol. 13.
Sehgal, et al., Separation of 300-nm and 100-nm particles in Fabry-Perot acoustofluidic resonators, Analytical Chemistry, Oct. 17, 2017, pp. 12192-12200, vol. 89.
Kanwar, et al., Microfluidic device (ExoChip) for on-chip isolation, quantification and characterization of circulating exosomes, Lab on a Chip 14, Mar. 14, 2014, pp. 1891-1900, vol. 14.
Ibsen, et al., Rapid isolation and detection of exosomes and associated biomarkers from plasma, ACS Nano, Jul. 3, 2107, pp. 6641-6651, vol. 11.
Nge, et al., Advances in microfluidic materials, functions, integration, and applications, Chemical Reviews, Feb. 14, 2013, pp. 2550-2583, vol. 113.
McDonald, et al., Fabrication of microfluidic systems in poly(dimethylsiloxane), Electrophoresis, 2000, pp. 27-40, vol. 21.

(56) References Cited

OTHER PUBLICATIONS

Wu, et al., Isolation of exosomes from whole blood by integrating acoustics and microfluidics, PNAS, Oct. 3, 2017, pp. 10584-10589, vol. 114, No. 40.
Dang, et al., Integrated Microfluidic Cooling and Interconnects for 2D and 3D Chip, IEEE Transcations on Advanced Packaging, Feb. 2010, vol. 33. No. 1.
Final Office Action received for U.S. Appl. No. 15/875,940 dated Nov. 19, 2020, 14 pages.
International Search Report and Written Opinion for PCT/IB2019/050271 dated Feb. 28, 2019, 9 pages.
International Search Report and Written Opinion for PCT/IB2019/050272 dated Mar. 27, 2019, 10 pages.
International Search Report and Written Opinion for PCT/IB2019/050273 dated Apr. 8, 2019, 9 pages.
Non-Final Office Action received for U.S. Appl. No. 15/875,940 dated Jun. 12, 2020, 33 pages.
Non-Final Office Action received for U.S. Appl. No. 15/875,905 dated May 15, 2020, 42 pages.
Non-Final Office Action received for U.S. Appl. No. 15/875,862 dated Sep. 18, 2020, 48 bages.
List of IBM Patents or Applications treated as related.
Examination Report under Section 18(3) received for GB Patent Application Serial No. GB2010486.5 dated Aug. 11, 2022, 5 pages.
Notice of Reasons for Refusal received for Japanese Patent Application Serial No. 2020-538794 dated Nov. 15, 2022, 10 pages (Including English Translation).
Non-Final Office Action received for U.S. Appl. No. 15/875,940 dated Jan. 19, 2022, 14 pages.
Non-Final Office Action received for U.S. Appl. No. 15/875,862 dated Dec. 31, 2021, 40 pages.
Office Action received for U.S. Appl. No. 15/875,940 dated Feb. 11, 2021, 10 pages.
Office Action received for Chinese Application Serial No. 201980008710.X dated Feb. 23, 2023, 7 pages (Original Copy Only).
Office Action received for Chinese Application Serial No. 201980007753.6 dated Feb. 25, 2023, 7 pages (Original Copy Only).
Decision to Grant a Patent received for Chinese patent Application Serial No. 201980008769.9 dated Jul. 31, 2023, 2 pages(Original Copy Only).
Decision to Grant a Patent received for Japanese Patent Application Serial No. 2020-538856 dated Jul. 25, 2023, 5 pages.
Decision to Grant a Patent received for Chinese patent Application Serial No. 201980007753.6 dated Aug. 24, 2023, 2 pages (Original Copy Only).
Non-Final Office Action received for U.S. Appl. No. 18/061,635 dated Mar. 30, 2023, 74 pages.
Notice of Allowance received for U.S. Appl. No. 18/061,635 dated Jun. 15, 2023, 63 pages.
Office Action dated Nov. 21, 2023 for DE Application No. 11 2019 000 463.8, 5 pages.

```
┌─────────────────────────────────────────────────────────┐
│ RECEIVING A BUFFER SOLUTION AND A SAMPLE SOLUTION AT     │
│ A MICROFLUIDIC CHIP COMPRISING A CONDENSER ARRAY, AN     │
│ INLET AND AN OUTLET, WHEREIN THE SAMPLE SOLUTION         │ ← 1002
│ COMPRISES A SAMPLE AND WASTE, AND WHEREIN THE BUFFER     │
│ SOLUTION AND THE SAMPLE SOLUTION FLOW THROUGH THE        │
│ CONDENSER ARRAY AT A RATE GREATER THAN ABOUT 1.0         │
│ NANOLITERS PER HOUR                                      │
└─────────────────────────────────────────────────────────┘
                              ↓
┌─────────────────────────────────────────────────────────┐
│ DISPLACING, BY THE CONDENSER ARRAY, A SAMPLE FORM THE    │
│ SAMPLE SOLUTION IN A DIRECTION LATERAL TO A SIDE WALL    │ ← 1004
│ OF THE MICROFLUIDIC CHIP, WHEREIN THE SAMPLE IS          │
│ DISPLACED INTO THE BUFFER SOLUTION                       │
└─────────────────────────────────────────────────────────┘
                              ↓
┌─────────────────────────────────────────────────────────┐
│ COLLECTING THE SAMPLE SEPARATE FROM THE WASTE VIA        │ ← 1006
│ THE OUTLET                                               │
└─────────────────────────────────────────────────────────┘
```

MICROFLUIDIC CHIPS FOR PARTICLE PURIFICATION AND FRACTIONATION

BACKGROUND

The subject disclosure relates to microfluidic chips, and more specifically to microfluid chips that can comprise one or more microscale and/or mesoscale condenser arrays, which can facilitate particle purification and/or fractionation.

The ability to purify particles (e.g., colloids) can be very important for practical applications and analysis of nanomaterials. Nowhere is this more vital than in biology and medicine, where bio-colloids ranging from proteins, vesicles and organelles, constitute the molecular building blocks of all living things. For example, exosomes are nanometer-sized extracellular vesicles (EVs) ranging in size from 30-150 nanometers (nm), which are regularly shed from cells and have emerged as a promising source of biomarkers (e.g. tumor-specific proteins, micro-ribonucleic acid ("mircoRNA"), messenger RNA ("mRNA"), and deoxyribonucleic acid ("DNA")) for diseases, such as cancer, with broad application in diagnosis, treatment monitoring, and/or therapeutics. Part of the attraction to these EVs is that they can be extracted for analysis from minimally or non-invasive liquid biopsies (e.g., blood, plasma, and/or urine samples), and can thereby reduce the need for tissue biopsies to obtain diagnostic information. Despite showing great promise, reliable methods of high-yield, high-purity exosome isolation from biological samples remain a significant impediment to their study and implementation as disease prognosticators and for biomarker discovery. While ultracentrifugation (UC) has emerged as the gold standard for EV isolation, other techniques such as filtration, precipitation, and immunoaffinity-based capture have been used as well; however, all of these techniques have intrinsic drawbacks as described below.

UC can exploit size differences between cells, EVs, and proteins to isolate these materials from each other using progressively higher spin speeds with intermediate extraction protocol. Major drawbacks can include high spin speeds, which can impact EV quality, and long run times (e.g., about 5 hours). UC is also a manual, batch process often resulting in lower exosome recovery and less than optimal EV quality.

Membrane filters, such as polyvinylidene difluoride (PVDF) or polycarbonate, are conventionally used to sieve cells and larger multivescular bodies (MVBs) from biological samples. This is sometimes coupled with UC to further separate exosomes from proteins. Multistep arrangements can require: a bulky centrifuge or vacuum system, use large sample volumes (e.g., 30-100 milliliters "mL"), require batch processing, and typically result in poor yields due to clogging.

Several kit-based solutions have emerged to circumvent the need for UC, including EXOEASY®, EXO-SPIN®, EXOQUICK® exosome precipitation, TOTAL EXOSOME ISOLATION REAGENT®, and/or PUREEXO®. These products use special reagents to induce precipitation of exosomes, such as polyethylene glycol ("PEG") based additives. These kits typically suffer from unacceptable purity due to polymer contamination, making downstream analysis difficult, and are often limited to small, batched sample volumes.

Immunoaffinity-based capture targets exosomes from a complex biological fluid using, for example, tetraspanin proteins such as CD81 found on the surface of exosomes or markers specific to the exosome's cell of origin to isolate them. A common technique utilizes antibody coated magnetic beads to capture exosomes that contain specific markers from bodily fluids. These methods can be expensive, relying on specific antibodies that can vary batch to batch and suffer from stability issues. While this method allows specific subpopulations of exosomes to be isolated, the cost of antibodies does not make it generally suitable for isolating exosomes from large quantities of biological samples.

In light of the inherent drawbacks of present solutions, there exists a recognition of the desire for a simple, inexpensive, automated, and rapid EV isolation technique. In a quest to fulfill these requirements, many have turned to microfluidic or lab-on-a-chip ("LOC") concepts owing to their potential to deliver on many of these fronts. Within this framework, techniques employing a host of mechanisms have been explored and exploited for nanoparticle separation in general, such as: field flow fractionation, centrifugal, optical, affinity capture, electrophoresis, dielectrophoresis, magnetophoresis, acoustophoresis, ion concentration polarization, electrohydrodynamic vortices, deterministic lateral displacement, and/or sieving. LOC methods hold the following properties, the majority being concomitant with these objectives: faster analysis and responses times due to short diffusion distances, fast heating, high surface-to-volume ratios, small heat capacities; lower fabrication costs, which can allow for cost-effective disposable chips that can be fabricated in mass production, and integrate multiple processes (e.g., labeling, purification, separation, and/or detection); high-throughput analysis due to massive parallelization possible due to compactness of integration; and/or low fluid volumes due to having reduced feature sizes from millimeters down to nanometers volumes as small as picoliters can be processed. Example LOC techniques can include the following.

Nanoscale deterministic lateral displacement ("nanoDLD") technology can demonstrate the ability to sub-fractionate exosome populations with tens of nanometers resolution in a continuous flow system (no batch processing) with a theory of operation. For example, UC purified exosomes were used in the devices. However, very low sample volumes were demonstrated although the technology does lend itself to massive parallelization for volume scale up.

Exodisc technology can regard a lab-on-a-disc integrated with two nano-filters that can allow automated and label-free enrichment of EVs in the size range of 20-600 nm within 30 min using a tabletop-sized centrifugal microfluidic system. Exodisc reported >95% recovery of EVs from cell culture and >100-fold higher concentration of mRNA as compared with UC. The technique can be automated, can process up to 1 milliliter (mL) of urine or cell cultured medium, and can includes a buffer wash to remove smaller contaminates. However, discs are large, meaning added cost, and sample processing is batched rather than continuous flow. Further, sub-fractionation of exosomes is not exhibited.

With viscoelastic flow techniques, exosomes from cell culture media and serum can be isolated in a continuous flow, field-free, and label-free manner using an additive polymer (poly-oxyethylene or PEO) to control the viscoelastic forces exerted on nanoscale EVs. A separation purity of >90% can be demonstrated with a recovery of >80% and a throughput of 200 microliters per hour ("µL/hr"). However, devices to facilitate viscoelastic flows can be large, requiring channels of 32 millimeter (mm) length to achieve lateral resolution of particle streams (plus space for input/out ports). Isolation of 100 nm and/or 500 nm particles sizes can be achieved but size selectivity here does not easily lend itself to exosome fractionation.

An exosome total isolation chip ("ExoTIC") filtration arrangement can be used to achieve EV yields ~4 to 1000-fold higher than UC using a low protein binding filter membrane from track-etched polycarbonate and a syringe pump driver at flowrates up to 5 mL/hr (e.g., up to 30 mL/hr shown on six parallel syringes). A buffer wash step allows for EV purification from smaller contaminates. Sub-fractionation can also be demonstrated by staging filters down to the nanoscale, and exosomes from specific cell lines can be analyzed in terms of their size distribution. However, since filtration and/or purification are inherently sequential processes, this is necessarily a batch process requiring over 2 hours to perform a sample preparation. Further, nanoparticle tracking analysis ("NTA") performed on sub-fractionated EV populations does not seem to indicate strong control of fractionated sizes.

As noted above, LOC technologies are limited to low fluid volumes, which is in conflict with an industry need for high throughput and/or shorter processing times when applied to exosome sample preparation as opposed to diagnostics, which can demand one to several mL per hour throughput of biological fluids. Thus, low fluidic volumes can reduce the list of usable conventional microfluidic techniques (e.g., both on and off chip) for exosome sample preparation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, apparatuses, and/or methods that can regard microfluidic chips, can facilitate particle purification and/or fractionation, are described.

According to an embodiment, an apparatus is provided. The apparatus can comprise a layer of a microfluidic chip. The layer can comprise an inlet that can receive fluid, an outlet that can output a purified version of the fluid, and a condenser array coupled between and in fluid communication with the inlet and the outlet. The condenser array can comprise a plurality of pillars arranged in a plurality of columns. Also, a pillar gap sized to facilitate a throughput rate of the fluid of greater than or equal to about 1.0 nanoliter per hour can be located between a first pillar of the plurality of pillars in a first column of the plurality of columns and a second pillar of the plurality of pillars in the first column.

According to an optional embodiment, the layer of the microfluidic chip further comprises a nanoscale deterministic lateral displacement array. Also, the nanoscale deterministic lateral displacement array can be coupled to the condenser array. Further, the nanoscale deterministic lateral displacement array can separate particles of the fluid purified in the condenser array.

According to an optional embodiment, the inlet can be in fluid communication with an inlet bus, which can be in fluid communication with a collection channel. Also, the collection channel can be in fluid communication with an outlet bus, which can be in fluid communication with the outlet.

According to another embodiment, a method is provided. The method can comprise receiving a buffer solution and a sample solution at a microfluidic chip, which can comprise a condenser array, an inlet, and an outlet. The sample solution can comprise a sample and waste. Also, the buffer solution and the sample solution can flow through the condenser array at a rate greater than about 1.0 nanoliters per hour. The method can further comprise displacing, by the condenser array, a sample from the sample solution in a direction lateral to a side wall of the microfluidic chip. The sample can be displaced into the buffer solution. Also, the method can comprise collecting the sample separate from the waste via the outlet. Additionally, in one or more embodiments the condenser array can be selected from a group consisting of a microscale condenser array and a mesoscale condenser array.

According to another embodiment, an apparatus is provided. The apparatus can comprise a layer of a microfluidic chip. The layer can comprise an inlet, an outlet, and a condenser array in fluid communication with the inlet and the outlet. Also, the condenser array can have a throughput flow rate greater than about 1.0 nanoliters per hour.

According to an optional embodiment, the condenser array can comprise a plurality of pillars arranged in a plurality of columns. A pillar gap greater than or equal to about 0.5 micrometers can be located between a first pillar of the plurality of pillars in a first column of the plurality of columns and a second pillar of the plurality of pillars in the first column. Also, the first pillar is adjacent to the second pillar.

Thus, various embodiments described herein can regard microfluidic chip designs and methods for achieving rapid, total particle (e.g., exosome) isolation and purification as well as downstream particle (e.g., exosome) sub-fractionation at high throughput volumes. Further, high-throughput capabilities can be achieved via an arrangement of one or more microscale and/or mesoscale condenser arrays. Therefore, one or more embodiments described herein can achieve particle (e.g., exosome) isolation that can provide: high sensitivity, high volume throughput, continuous flow particle (e.g., exosome) purification and/or collection, reduced processing time, sub-fractionation capacities, and/or compact architecture that can enable automation.

BRIEF DESCRIPTION OF THE DRAWINGS

FIG. 10 illustrates a flow diagram of an example, non-limiting method that can comprise purifying and/or fractionalizing one or more particles via a microfluidic chip in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
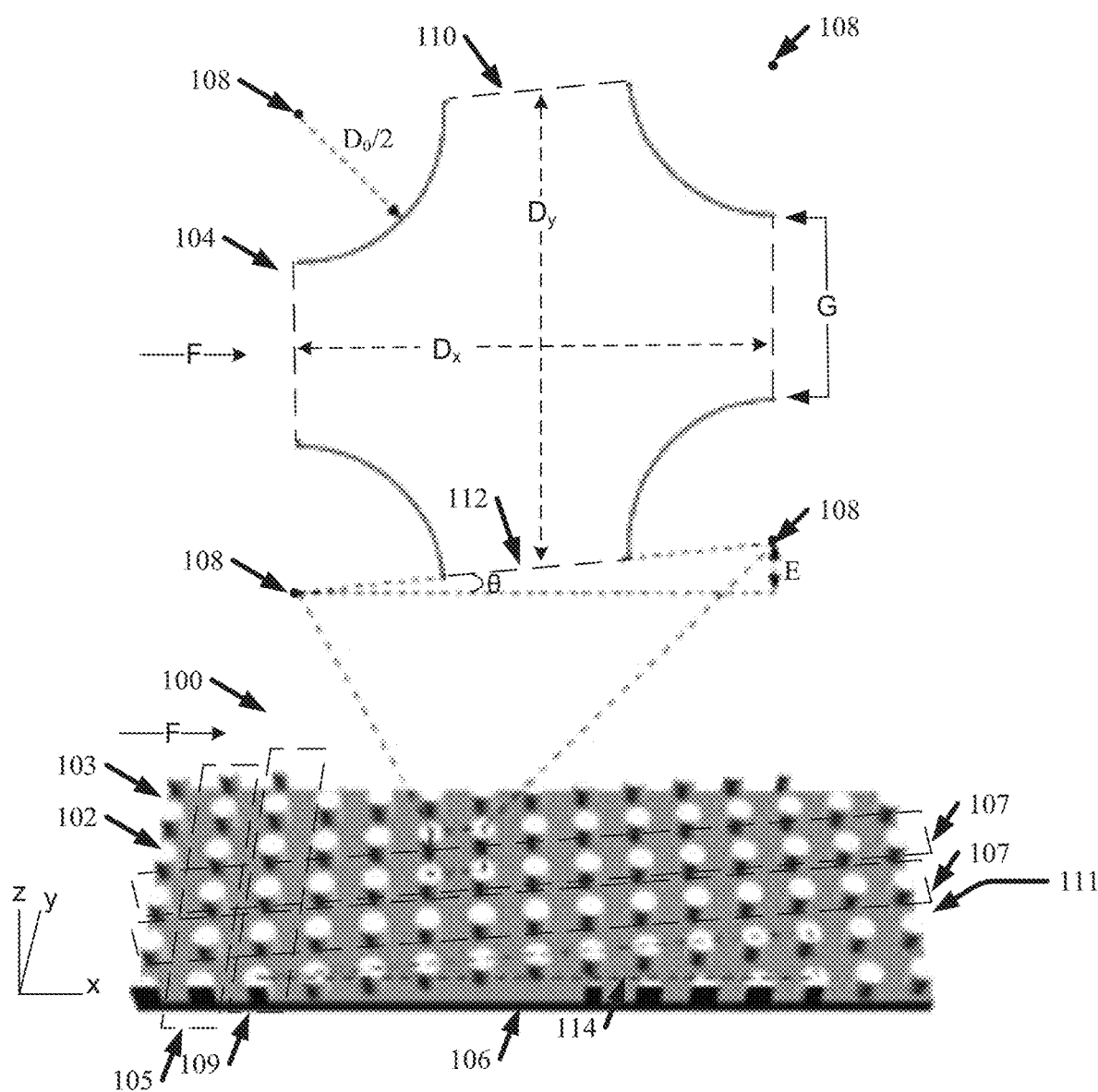
FIG. 1 illustrates a diagram of an example, non-limiting microscale condenser array that can comprise a microfluidic chip in accordance with one or more embodiments described herein.

FIG. 1 illustrates a diagram of an example, non-limiting condenser array 100 in accordance with one or more embodiments described herein. The condenser array 100 can be located within a microchannel 103 and can comprise a plurality of pillars 102. The condenser array 100 can operate on a principle of hydrodynamic chaos facilitated by one or more lattice structures 104 defined by the plurality of pillars 102. The condenser array 100 can be a microscale condenser array and/or a mesoscale condenser array. For example, the condenser array 100 can have one or more geometries on the microscale and/or the mesoscale. As used herein, the term "microscale" can refer to one or more devices, apparatuses, and/or features having one or more characteristic dimensions greater than or equal to 1 micrometer and less than or equal to 999 micrometers. As used herein, the term "mesoscale" can refer to one or more devices, apparatuses, and/or features having one or more characteristic dimensions greater than or equal to 0.1 millimeters and less than or equal to 100 millimeters.

A fluid can flow through the microchannel 103, and thereby the condenser array 100, in a direction indicated by the arrow "F" in FIG. 1. When a fluid flow F is directed through the condenser array 100, the plurality of pillars 102 can act to deflect the fluid itself, causing a minor lateral component to the fluid flow which does not average out over the length of the microchannel 103. A net lateral displacement of the fluid can laterally move one or more particles (e.g., colloids) comprising the fluid, and thereby can affect a spatial displacement or "condensation" within the condenser array 100. The condenser array 100 can concentrate one or more particles (e.g., colloids) into a concentrated stream. Further, the concentrated stream can comprise one or more particles (e.g., colloids) of a particular size and/or one or more particles (e.g., colloids) of various sizes.

Condensing one or more particles (e.g., colloids) of the fluid into a concentrated stream can be useful for concentrating a sample and/or preparing a sample for further separation into streams based on size/chemistry for purification. Since the condenser array 100 can manipulate the fluid flow itself, particles (e.g., colloids) within the fluid, regardless of size, can experience the same lateral displacement. The condensing (e.g., the lateral fluid displacement) that can be achieved by the condenser array 100 can depend on the geometry of the one or more lattice structures 104 and/or the plurality of pillars 102. Previous art has specified the geometry only on the nanoscale (e.g., less than 500 nanometers (nm) for all dimensions). In one or more embodiments described herein, the condenser array 100 can comprise a microscale structure that can still manipulate nano-size particles (e.g., colloids).

As shown in FIG. 1, the plurality of pillars 102 can be arranged in a plurality of columns (e.g., column 105 traversing the microchannel 103 along the "y" axis) and/or a plurality of rows (e.g., column 107 traversing the microchannel 103 along the "x" axis). Additionally, adjacent columns (e.g., adjacent columns 105, 109) comprising the plurality of pillars 102 can be arranged offset each other (e.g., along the y axis), thereby positioning the plurality of rows at an angle to one or more walls 106 of the microchannel. FIG. 1 shows an expanded view of an exemplary lattice structure 104 defined by four pillars (e.g., pillar 102 can be an example of one of the four pillars).

The lattice structure 104 can be defined by four pillars of the plurality of pillars (e.g., where one or more pillars can be as shown at pillar 102). The lattice structure 104 can be located throughout the condenser array 100 and/or at portion of the condenser array 100. Further, the four pillars 102 can be adjacent to each other. For example, two adjacent pillars 102 of a column 105 and two adjacent pillars of a row 107 can define a lattice structure 104, wherein the column 105 and the row 107 can be adjacent to each other. FIG. 1 shows an example of four exemplary pillars, which can define a lattice structure 104, with dashed lines. Further, as shown in FIG. 1, dashed lines delineate an expanded view of an exemplary lattice structure 104 defined by the four exemplary pillars 102. One of ordinary skill in the art will recognize, that the condenser array 100 can comprise one or more lattice structures 104 in one or more locations within the microchannel 100 other than the location of the exemplary, expanded lattice structure 104 shown in FIG. 1.

As shown in FIG. 1 "E" can represent a lateral shift between centers 108 of pillars 102 of sequential columns. The lateral shift (e.g., represented by E) between sequential columns of pillars 102 can be characterized by formula 1: $D_y/N$. The lateral shift (e.g., represented by E) of the condenser array 100 can be greater than or equal 0.01 and/or less than or equal to 0.3.

As shown in FIG. 1, "$D_y$" can represent a first distance across the lattice structure 104 along the y axis of the condenser array 100. $D_y$ can extend from a first boundary 110 of the lattice structure 104 to a second boundary 112 of the lattice structure 104. Further, the first boundary 110 can be defined by a first center line of a first row of pillars 102, and the second boundary 112 can be defined by a second center line of a second row of pillars 102; wherein the first row of pillars 102 and the second row of pillars 102 can be adjacent to each other in some embodiments. In some embodiments, $D_y$ can be greater than or equal to 1 μm and/or less than or equal to 100 μm.

As shown in FIG. 1, "N" can represent a number of sequential columns necessary to overcome the lateral shift and place two columns in alignment. For example, for the condenser array 100 shown in FIG. 1, N can equal 10 as indicated by the dashed triangle 114, which exemplifies the lateral shift.

Further, as shown in FIG. 1, "$D_x$" can represent a second distance across the lattice structure 104 along the x axis of the condenser array 100. $D_x$ can extend from a third boundary 116 of the lattice structure 104 to a fourth boundary 118 of the lattice structure 104. Further, the third boundary 116 can be defined by a third center line of a first column of pillars 102, and the fourth boundary 118 can be defined by a fourth center line of a second column of pillars 102; wherein the first column of pillars 102 and the second column of pillars 102 can be adjacent to each other. Additionally, $D_y$ can be measured along a first direction (e.g., along the y axis of the condenser array 100) that is orthogonal to a second direction (e.g., along the x axis of the condenser array 100), along which the $D_x$ can be measured. In some embodiments, $D_x$ can be greater than or equal to 1 μm and less than or equal to 100 μm.

Moreover, as shown in FIG. 1 "$D_0$" can represent a diameter of the plurality of pillars 102 defining a subject lattice structure 104. The $D_0$ of the pillars 102 can be greater than or equal to 0.5 μm and/or less than or equal to 99.5 μm. Further, the plurality of pillars 102 can have a height greater than or equal to 1 μm and/or less than or equal to 100 μm. As shown in FIG. 1, "G" can represent a pillar gap between adjacent pillars 102 of the same column. The condenser array 100 can have a G of greater than or equal to 0.5 micrometers (μm) and/or less than or equal to 100 μm. Further, as shown in FIG. 1, "θ" can represent an angle respective of a wall 106 of the microchannel 103. The θ can be greater than 0 degrees and less than 90 degrees.

A lattice ratio of the lattice structure 104 can be characterized by formula 2: $D_x/D_y$. The lattice ratio can be greater than 0.1 and/or less than or equal to 1.0 to facilitate operation of the condenser array 100. Additionally, a geometry ratio of the condenser array 100 can be characterized by formula 3: $D_0/D_y$. The geometry ratio can be greater than 0.1 and less than or equal to 1.0 to facilitate operation of the condenser array 100. Additionally, the condenser array 100 can comprise greater than or equal 100 columns of pillars 102 to facilitate operation. For example, the condenser array 100 can have an overall length (e.g., along the x axis) greater than or equal to 0.1 millimeters (mm) and less than or equal to 10 mm. An embodiment of the condenser array 100 comprising one or more of the geometries described herein can facilitate a microscale and/or mesoscale condenser array 100 structures and/or facilitate high throughput rates.

In various embodiments, the plurality of pillars 102 can have a variety of shapes that can facilitate the geometric dimensions (e.g., regarding the condenser array 100 and/or the lattice structure 104) described herein. Example, pillar 102 shapes can include, but are not limited to: a circular shape, a triangular shape, a square shape, a U shape, a napiform shape, a pentagonal shape (e.g., an irregular pentagon), and/or the like. In one or more embodiments, the condenser array 100 can a plurality of lattice structures 104, wherein respective lattice structures 104 can have varying geometries depending on the subject lattice structure's 104 location along the condenser array 100.

Embodiments in which the one or more condenser arrays 100 comprise the geometries described herein can have microscale and/or mesoscale pillar 102 gaps (e.g., represented by G), which can be more conductive to fluid flow than conventional nanoscale pillar 102 gaps. Additionally, the microscale and/or mesoscale pillar 102 gaps can facilitate larger pillar 102 than conventional arrays, which can be formed using reactive-ion etching during fabrication thereby getting a further linear enhancement in throughput.

Figure 2:
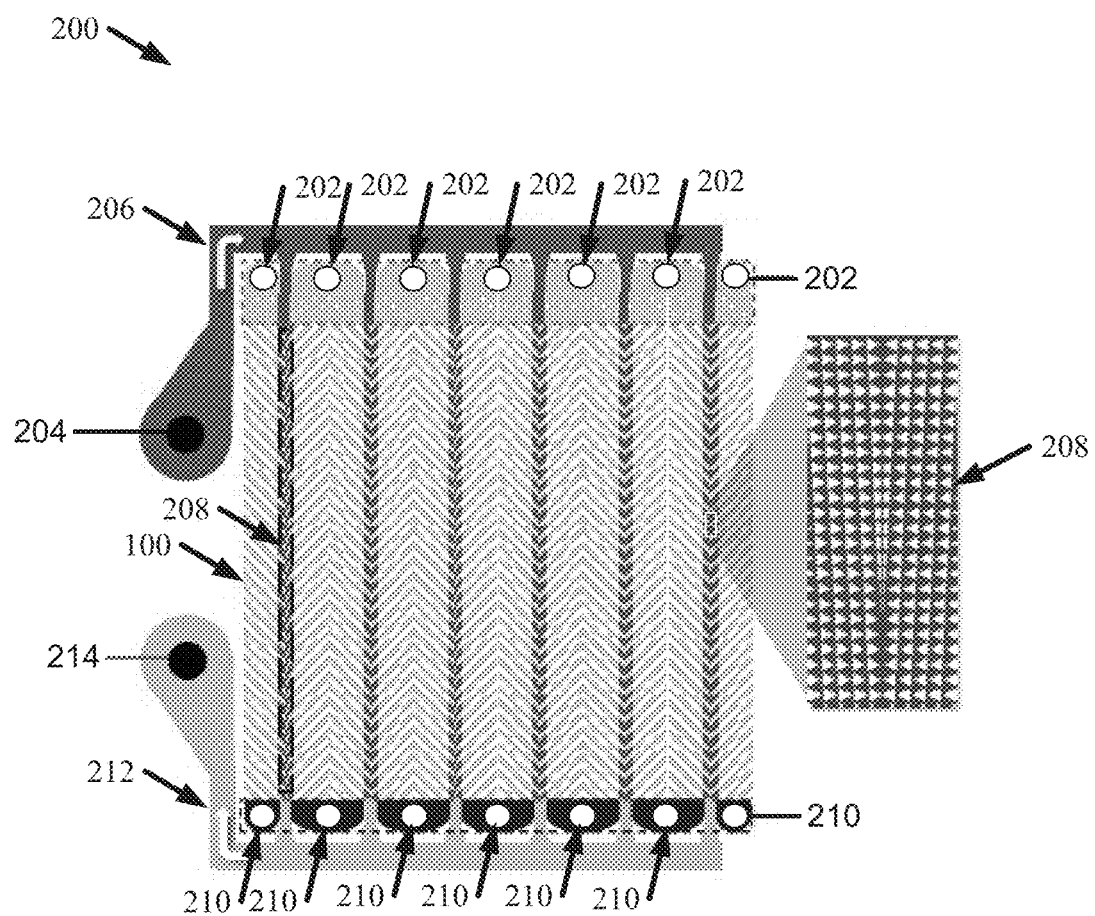
FIG. 2 illustrates a diagram of an example, non-limiting microfluidic chip in accordance with one or more embodiments described herein.

FIG. 2 illustrates a diagram of an example, non-limiting layer 200 of a microfluidic chip in accordance with one or more embodiments described herein. Repetitive description of like elements employed in other embodiments described herein is omitted for sake of brevity. The microfluidic chip can be a lab-on-chip designed to purify and/or fractionize a sample fluid (e.g., a biological sample fluid). Additionally, the microfluidic chip can be a part of a handheld apparatus and/or a purification system (e.g., including an automated system). For example, the handheld apparatus and/or purification system can comprise one or more pressure devices to facilitate flowing a fluid (e.g., a sample fluid and/or a buffer fluid) from one or more first reservoirs (e.g., inlet basins), through one or more condenser arrays 100, and into one or more second reservoirs (e.g., outlet basins).

The layer 200 can comprise a plurality of inlets and/or outlets in fluid communication with one or more condenser arrays 100 to facilitate purification and/or fractionation of one or more fluids. In one or more embodiments, a microfluidic chip can comprise a plurality of layers 200 (e.g., wherein respective layers 200 can be located adjacent, horizontally and/or vertically, to each other or other chip layers). One or more fluids can flow through layer 200 at a steady state, which can be affected by an external driving force that can include, but is not limited to: electro-osmotic flow, pressure driven flow, capillary flow, a combination thereof, and/or the like.

A challenge with and stronger constraint of nanoDLD as it applies to sample preparation is that the resulting small arrays and features have high fluidic resistance and thus lower throughput for a given array (e.g., about 0.2 μL/hr) making single arrays impractical for higher volume exosome sample preparations of 1-10 mL. However, integrated condenser arrays 100 on single and/or multi-layer substrates can provide a means of scaling up sample volume to several mL per hour throughput rates.

As shown in FIG. 2, one or more condenser arrays 100 can be in fluid communication with one or more sample inlets 202. A sample fluid can enter the one or more condenser arrays 100 via the one or more sample inlets 202. The layer 200 can further comprise a buffer inlet 204 in fluid communication with one or more inlet buses 206, which can also be in fluid communication with the one or more condenser arrays 100. The buffer inlet 204 can also be in fluid communication with a buffer reservoir located on or off the microfluidic chip. A buffer can flow from the buffer reservoir to the one or more inlet buses 206 via the buffet inlet 204. The buffer can further flow through the one or more inlet buses 206 and enter the one or more condenser arrays 100. The buffer can serve as a purification medium, which can facilitate particle (e.g., exosome) exchange within the condenser array 100.

The one or more condenser arrays 100 comprising the layer 200 of the microfluidic chip can comprise a plurality of lattice structures 104 configured to displace fluid towards one or more collection channels 208 (e.g., comprising a portion of the one or more condenser arrays 100). The buffer can flow from the one or more inlet buses 206 into the one or more collection channels 208. Further, one or more particles (e.g., exosomes) comprising the sample fluid can be laterally displaced into the one or more collection channels 208. For example, FIG. 2 shows an expanded view of a configuration of lattice structures 104 that can displace particles into the one or more collection channels 208. Thus, the one or more condenser arrays 100 can concentrate and/or redirect particle (e.g., exosome) populations down to a particle size into a buffer stream, thereby purifying the subject particles (e.g., exosomes) from the sample fluid.

The one or more condenser arrays 100 can further be in fluid communication with one or more waste outlets 210 and/or one or more outlet buses 212. Additionally, the one or more outlet buses 212 can be in fluid communication with one or more particle outlets 214. The concentrated stream of buffer and displaced particles (e.g., exosomes) can flow through the one or more collection channels 208 and into the one or more outlet buses 212. The stream of buffer and particles (e.g., exosomes) can further flow through the one or more outlet buses 212 and into a particle reservoir via the one or more particle outlets 214. The sample fluid which is not displaced into the one or more collection channels 208 (e.g., waste comprising the sample fluid) can flow from the one or more condenser arrays 100 into one or more waste outlets 210. Unwanted salts, small molecules, proteins, and/or the like can exhibit unaltered trajectories through the one or more condenser arrays 100 due to sufficiently small particle size, and thereby enter one or more waste outlets 210.

In one or more embodiments, because condensers arrays 100 can be most efficient at separating for a given pillar gap size G when the row-shift fraction value is small, the length of a condenser array 100 can be 20 times (20×) or greater in distance compared to the width of the condenser array 100. Hence, the narrow and long dimensions of a single condenser array 100 can lend the device more practically to a multiplexed arrangement of condenser arrays 100, where the microfluidic chip surface can be more efficiently utilized to enhance throughput linearly with the number of condenser arrays 100 added. Inlets (e.g., buffer inlet 204 and/or sample inlets 202) and outlets (e.g., particle outlet 214 and/or waste outlets 210) can extend through the microfluidic chip using for example through silicon vias (TSVs) with a glass bonded ceiling and/or from the top of the chip through aligned, structured glass holes in the bonded glass. These vias and devices can also be fabricated in molded plastics, such as cyclo-olefin polymer ("COP"), that are compatible with biological samples.

Referring again to FIG. 2, here a biological sample (e.g., a sample fluid), such as urine, blood, plasma, etc. can be inputted through top vias (e.g., sample inlets 202) and introduced into an optional on-chip filtration element. This may include cross-flow serpentine filters, traps, sieves, or a number of other microfluidic filter arrangements to capture cells and larger MVBs and/or EVs while letting exosomes pass into the downstream condenser devices. Alternatively, pre-filtration can be performed off-chip or a combination of the two (e.g. filter cells off-chip, filter larger MVBs and/or EVs on-chip). Sample fluids can be introduced as fully concentrated (or as-received) from a patient or first diluted by an operator. A wash buffer can be introduced from a common inlet (e.g., inlet bus 206) that can feed the condenser array 100. The condenser array 100 can deflects particles (e.g., EVs) down to a specified cutoff between 30-100 nm, as defined by the condenser dimensions and geometry, toward one or more collection channels 208. Deflected EVs can be displaced into a buffer where they are purified and smaller contaminants (e.g., small molecules, lipids, proteins, and/or the like) can move with the flow and into the one or more waste outlets 210.

Purified particles (e.g., exosomes) can exit from the condenser array 100 and empty into a common outlet (e.g., a particle reservoir) where they can be collected by an operator of the microfluidic chip. The process can be partially or fully automated by mounting microfluidic chips in flow cells and prewetting, and/or by incorporating the technology into a disposable plastic format and driving fluid flow with a pressure manifold. The plurality of pillars 102 are shown as triangular posts in FIG. 2 given their demonstrated efficiency in deflection compared to circular posts.

Figure 3:
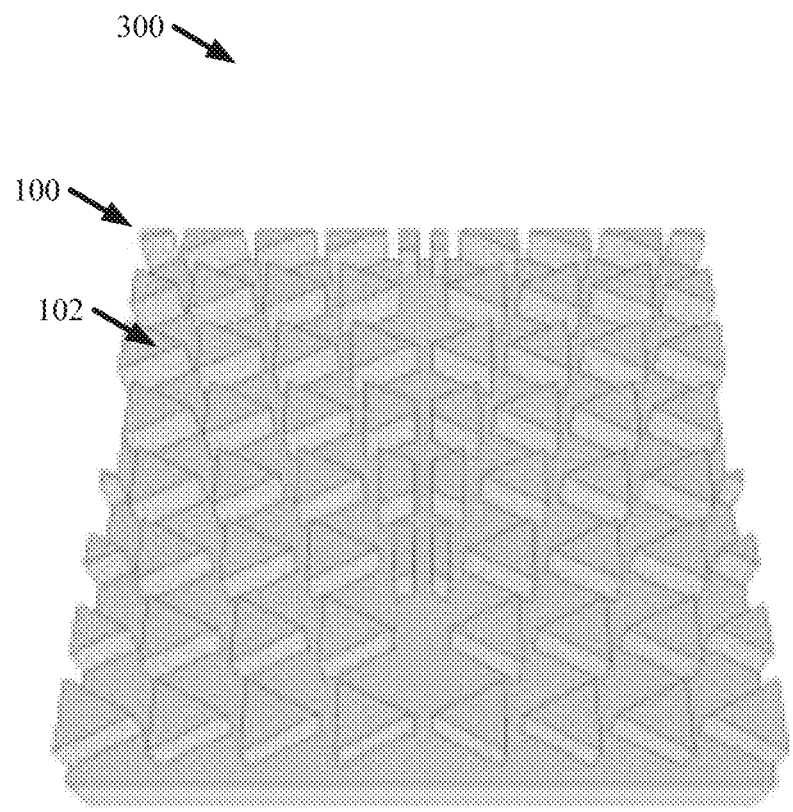
FIG. 3 illustrates a diagram of an example, non-limiting lattice structure for a microscale condenser array that can comprise a microfluidic chip in accordance with one or more embodiments described herein.

FIG. 3 illustrates a diagram of an example, non-limiting first arrangement 300 of pillars 102 (e.g., plurality of lattice structures 104) that can comprise one or more condenser arrays 100 in layer 200 in accordance with one or more embodiments described herein. Repetitive description of like elements employed in other embodiments described herein is omitted for sake of brevity. The first arrangement 300 depicted in FIG. 3 can be located between the one or more collection channels 208. Further, the pillar 102 arrangement depicted in FIG. 3 can facilitate displacement of one or more particles (e.g., exosomes) to a plurality of collection channels 208 (e.g., displacement towards a first collection channel 208 can be located to the left of the first arrangement, and/or displace towards a second collection channel 208 that can be located to the right of the first arrangement 300). One of ordinary skill in the art will recognize: that FIG. 3 shows a portion of the first arrangement 300, that the dimensions (e.g., number of pillars 102) is not limited to those depicted in FIG. 3, and/or the first arrangement 300 can traverse the length of one or more adjacent collection channels 208.

Figure 4:
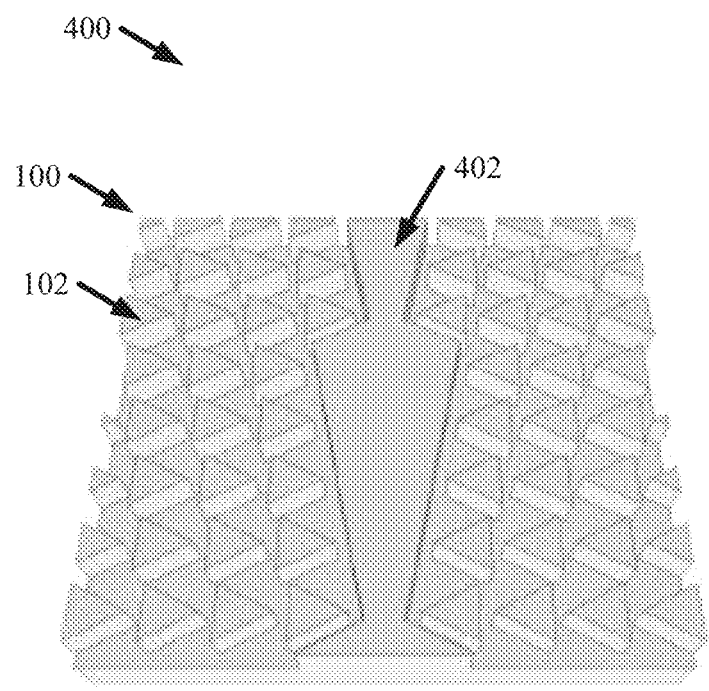
FIG. 4 illustrates another diagram of an example, non-limiting lattice structure for a microscale condenser array that can comprise a microfluidic chip in accordance with one or more embodiments described herein.

FIG. 4 illustrates another diagram of another example, non-limiting second arrangement 400 of pillars 102 (e.g., plurality of lattice structures 104) that can comprise one or more condenser arrays 100 in layer 200 in accordance with one or more embodiments described herein. Repetitive description of like elements employed in other embodiments described herein is omitted for sake of brevity. The second arrangement 400 depicted in FIG. 4 can also be located between the one or more collection channels 208. Further, the second arrangement 400 can also facilitate displacement of one or more particles (e.g., exosomes) to a plurality of collection channels 208 (e.g., displacement towards a first collection channel 208 can be located to the left of the second arrangement 400, and/or displace towards a second collection channel 208 that can be located to the right of the second arrangement 400). One of ordinary skill in the art will recognize: that FIG. 4 shows a portion of the second arrangement 400, that the dimensions (e.g., number of pillars 102) is not limited to those depicted in FIG. 4, and/or the second arrangement 400 can traverse the length of one or more adjacent collection channels 208.

As shown in FIGS. 3 and 4, the second arrangement 400 can comprise a partition wall 402, whereas the first arrangement 300 can be absent such a wall. Both the first arrangement 300 and/or the second arrangement 400 can serve to direct a sample fluid inputted into the one or more condenser arrays 100 towards one or more collection channels 208 (e.g., located adjacent to the first arrangement 300 and/or second arrangement 400). Further, the one or more condenser arrays 100 can comprise: one or more first arrangements 300, one or more second arrangements 400, and/or one or more first arrangements 300 and second arrangements 400. Further, in one or more embodiments the first arrangement 300 and/or the second arrangement 400 can serve to operably couple adjacent condenser arrays 100. Various embodiments comprising the first arrangement 300 and/or the second arrangement 400 can advantageously comprise one or more condenser arrays 100 that can share a common buffer and particle (e.g., exosome) stream; thereby minimizing layout complexity on the layer 200.

Figure 5:
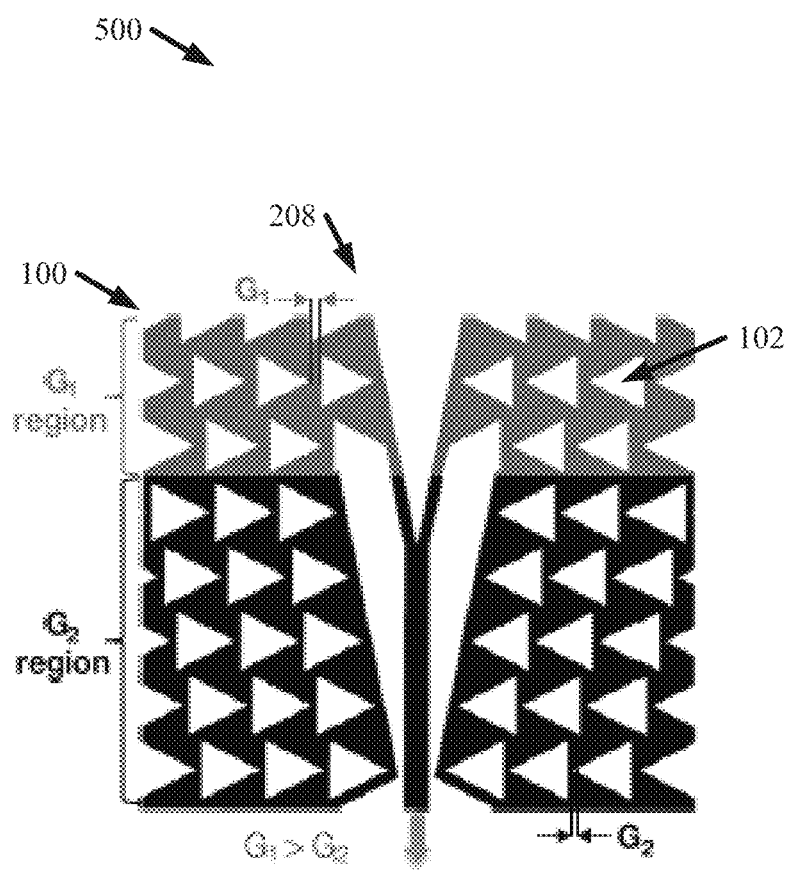
FIG. 5 illustrates another diagram of an example, non-limiting lattice structure for a microscale condenser array that can comprise a microfluidic chip in accordance with one or more embodiments described herein.

FIG. 5 illustrates a diagram of an example, non-limiting gradient geometry scheme 500 that can be applicable to one or more condenser arrays 100 comprising one or more layers 200 of a microfluidic chip. Repetitive description of like elements employed in other embodiments described herein is omitted for sake of brevity. As shown in FIG. 5 one or more geometries of the condenser arrays 100 (e.g., of one or more lattice structures 104, first arrangements 300, second arrangements 400, and/or collection channels 208 comprising a condenser array 100) can vary along different portions of the condenser array 100.

The one or more condenser arrays 100 can comprise a first region characterized by one or more first geometries and/or a second region characterized by one or more second geometries. For example, FIG. 5 illustrates the pillar 102 arrangement of a portion of an exemplary collection channel 208, which can comprise a first region and/or a second region. The first region can be represented by "$G_1$ region," and can be characterized as having a first pillar gap, which can be represented by "$G_1$." The second region can be represented by "$G_2$ region," and can be characterized as having a second pillar gap, which can be represented by "$G_2$." Further, the first pillar gap (e.g., represented by $G_1$) can be different than the second pillar gap (e.g., represented by $G_2$). For example, the first pillar gap (e.g., represented by $G_1$) can be greater than the second pillar gap (e.g., represented by $G_2$).

In addition, one of ordinary skill in the art will recognize that while variations in pillar gaps are shown in FIG. 5, the gradient geometry scheme 500 can be characterized by any of the other geometries described herein. Moreover, while the gradient geometry scheme 500 is described above with regard to two regions, the gradient geometry scheme 500 can comprise additional regions (e.g., three and/or more) to further facilitate efficiency of the condenser array 100. An embodiment in which the one or more condenser arrays 100 comprise a gradient geometry scheme 500 can advantageously allowing larger particles (e.g., EVs) to exit the condenser array 100 into an alternate exit channel within a subject collection channel 208 before the gap size reduces downstream, which may be useful in clog mitigation, particularly in cases where there is a large range of particles (e.g., EVs) that cannot be efficiently captured by a single pillar gap size.

Figure 6:
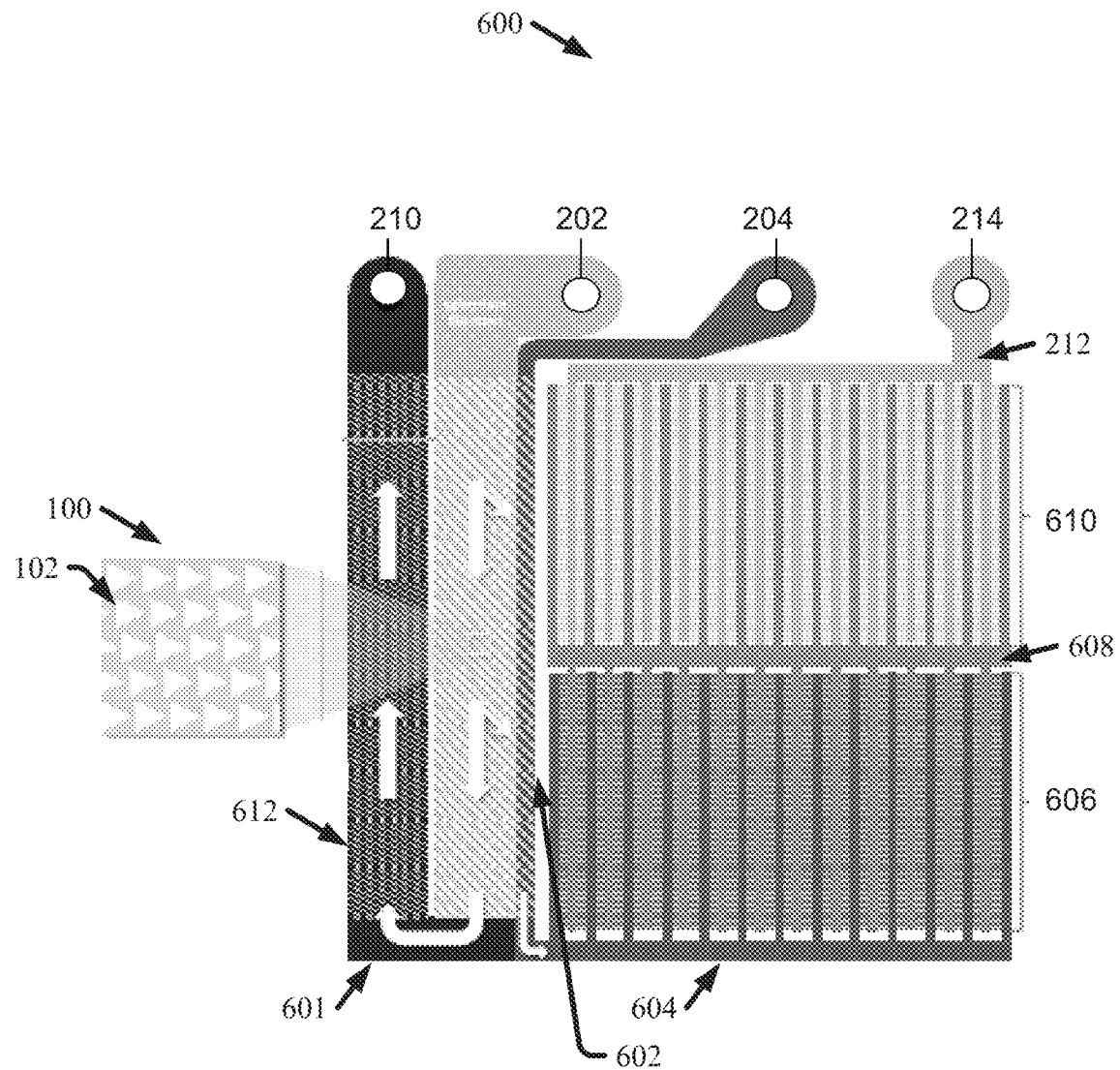
FIG. 6 illustrates another diagram of an example, non-limiting microfluidic chip in accordance with one or more embodiments described herein.

FIG. 6 illustrates a diagram of an example, non-limiting layer 600 of a microfluidic chip that can comprise one or more condenser arrays 100 in conjunction with one or more nanoDLD array banks in accordance with one or more embodiments described herein. Repetitive description of like elements employed in other embodiments described herein is omitted for sake of brevity. Layer 600 can comprise one or more condenser arrays 100, one or more nanoDLDs, a plurality of inlets, and/or a plurality of outlets. In one or more embodiments, a microfluidic chip can comprise a plurality of layers 600 (e.g., wherein respective layers 600 can be located adjacent, horizontally and/or vertically, to each other or other chip layers). One or more fluids can flow through layer 600 at a steady state, which can be effected by an external driving forced that can include, but is not limited to: electro-osmotic flow, pressure driven flow, capillary flow, a combination thereof, and/or the like.

As shown in FIG. 6, one or more sample inlets 202 and/or one or more buffer inlets 204 can be in fluid communication with one or more condenser arrays 100. As described with regard to FIG. 2, a sample fluid can flow from the one or more sample inlets 202 to the one or more condenser arrays 100. Also, as a buffer can flow from the one or more buffer inlets 204 to the one or more condenser arrays 100. As the sample fluid flows through the one or more condenser arrays 100, one or more particles (e.g., exosomes) within the sample fluid can be displaced towards a collection wall 602 of the one or more condenser arrays 100. One or more displaced particles within the sample fluid can collect along the collection wall 602 and thereby form a concentrated stream of a sample, which can flow adjacent to the collection wall 602 to one or more first inlet buses 604. Also, the buffer can flow through the condenser array 100, adjacent to the collection wall 602, and to the one or more first inlet buses 604; such that the one or more displaced particles can be displaced into the buffer to form the concentrated stream. Additionally, other particles comprising the sample fluid that are not displaced by the one or more condenser arrays 100 (e.g., waste and/or other contaminants comprising the sample fluid) can flow through the one or more condenser arrays 100 to one or more waste buses 601, which can guide the fluid to a waste outlet 210 (e.g., which can be in fluid communication with a waste reservoir).

The one or more first inlet buses 604 can be in fluid communication with one or more nanoDLDs. For example, the one or more first inlet buses 604 can be in fluid communication with a first bank 606 of one or more nanoDLD arrays. As the concentrated stream of sample and/or buffer flows from the one or more first inlet buses 604 and through the first bank 606 of one or more nanoDLD arrays; one or more particles of a first size, which can comprise the sample, can be displaced and carried to one or more outlets, while the remaining sample can flow to one or more second inlet buses 608. The one or more second inlet buses 608 can be in fluid communication with a second bank 610 of one or more nanoDLD arrays. Thus, the remaining sample can flow from the one or more second inlet buses 608 into the second bank 610 of one or more nanoDLD arrays. As the remaining sample flows through the second bank 610 of one or more nanoDLD arrays, particles of a second size can be displaced and carried to one or more other outlets, while non-displaced particles comprising the remaining sample can flow to one or more outlet buses 212. The one or more outlet buses 212 can be in fluid communication with one or more particle outlets 214. Thus, particles, which comprised the sample, of a third size can flow through the one or more outlet buses 212 to the one or more particle outlets 214 (e.g., which can be in fluid communication with one or more particle reservoirs). While FIG. 6 illustrates two banks of nanoDLD arrays, the architecture of layer 600 is not so limited. For example, layer 600 can comprise more or less than the two banks depicted in FIG. 6.

Operation of layer 600 can be similar to operation of layer 200 depicted in FIG. 2; however, layer 600 can also subfractionate one or more purified particle (e.g., exosome) populations downstream of one or more condenser arrays 100 (e.g., via one or more banks of nanoDLD arrays). The sample inlet can bring sample to an optional upstream filtration element as in the previous case. Here, sample can be inputted into one or more condenser arrays 100 with a buffer exchange. Additionally, purified particle (e.g., exosome) populations at a condenser array 100 exit can next be distributed across as a bus system (e.g., comprising first inlet bus 604, second inlet bus 608, and/or outlet bus 212) that can feed one or more banks of multiplexed nanoDLD arrays, wherein the purified particles can be more finely fractionated according to size. The bus system can be independently defined and etched deeper than the arrays (e.g., the one or more condenser arrays and/or the nanoDLD arrays) themselves to ensure proper fluid distribution. The nanoDLD element may include a single fractionation bank or several. The smaller fraction of the particle (e.g., exosome) population can be feed to the next nanoDLD array bank where the smaller size population can be further subdivided. Successive nanoDLD array banks can necessarily have progressively smaller gaps, such that successive banks can have more multiplexed arrays than the previous one in order to conductance match the banks.

Further, a resistive element 612 for the waste material can be included in the waste outlet bus 601 for the purpose of conductance matching, and can thereby prevent any unexpected or uneven flow distribution along the condenser array 100 exit. The resistive element 612 can be constructed from serpentine channels, contain constricting channels or features, such as pillars or sieves, or other such microfluidic features known in the art.

Figure 7:
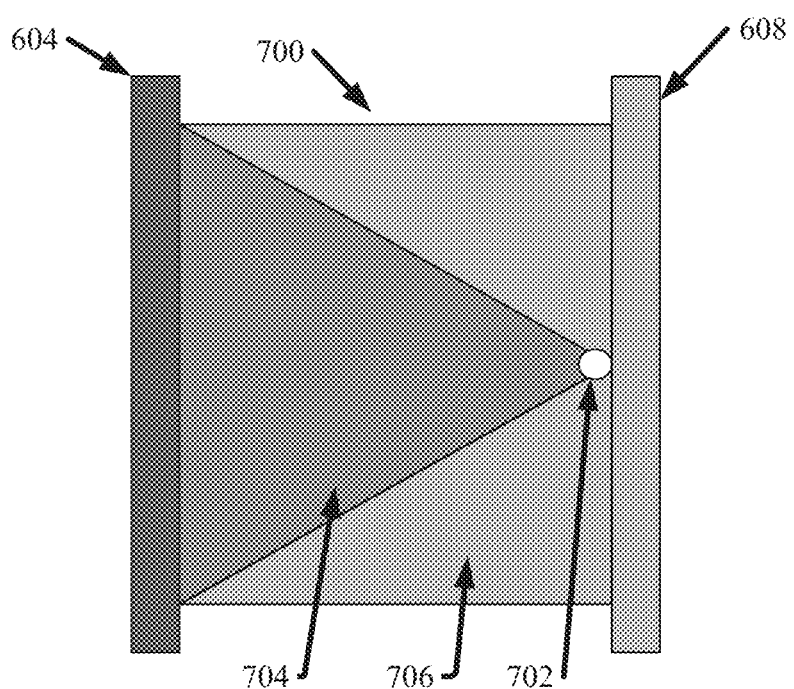
FIG. 7 illustrates a diagram of an example, non-limiting flow path that can be facilitated by a microfluidic chip in accordance with one or more embodiments described herein.

FIG. 7 illustrates a diagram of an example, non-limiting array 700 that can comprise the first bank 606 of nanoDLD arrays in accordance with one or more embodiments described herein. Repetitive description of like elements employed in other embodiments described herein is omitted for sake of brevity.

As shown in FIG. 7, the array 700 can be in fluid communication with the first inlet bus 604 and/or the second inlet bus 608. Fluid can flow from the first inlet bus 604, through the array 700, and into the second inlet bus 608. As fluid flows through the array 700, particles of a first size can be directed to an array outlet 702, while particles of a second size can flow to the second inlet bus 608. As shown in FIG. 7 a first region 704 depicts an exemplary flow path that can be achieved by particles of the first size, while a second region 706 depicts an exemplary flow path that can be achieved by particles of the second size.

Figure 8:
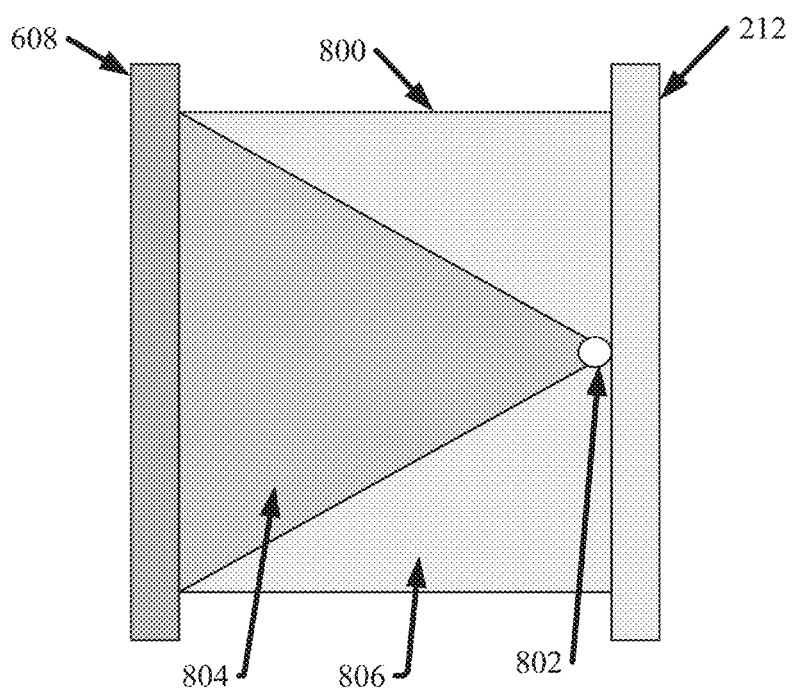
FIG. 8 illustrates another diagram of an example, non-limiting flow path that can be facilitated by a microfluidic chip in accordance with one or more embodiments described herein.

FIG. 8 illustrates a diagram of an example, non-limiting array 800 that can comprise the second bank 608 of nanoDLD arrays in accordance with one or more embodiments described herein. Repetitive description of like elements employed in other embodiments described herein is omitted for sake of brevity.

As shown in FIG. 8, the array 800 can be in fluid communication with the second inlet bus 608 and/or the outlet bus 212. Fluid can flow from the second inlet bus 608, through the array 800, and into the outlet bus 212. As fluid flows through the array 800, particles of the second size can be directed to an array outlet 802, while particles of a third size can flow to the outlet bus 212. As shown in FIG. 8 a third region 804 can depict an exemplary flow path that can be achieved by particles of the second size, while a fourth region 806 can depict an exemplary flow path that can be achieved by particles of the third size. In various embodiments, the first particle size (e.g., which can characterize particles that can exit via array outlet 702) can be greater than the second particle size (e.g., which can characterize particles that can exit via array outlet 802), and the second particle size can be greater than the third particle size (e.g., which can characterize particles that can flow into the outlet bus 212).

Figure 9:
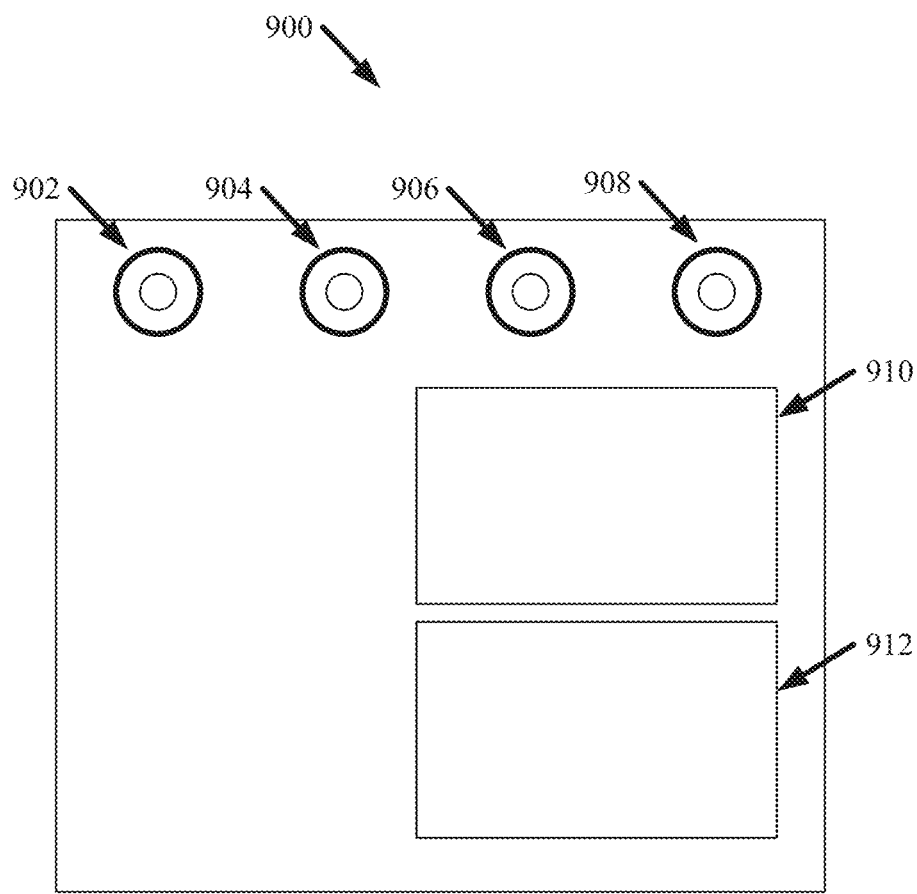
FIG. 9 illustrates a diagram of an example, non-limiting manifold interface that can comprise a microfluidic chip in accordance with one or more embodiments described herein.

FIG. 9 illustrates a diagram of an example, non-limiting interface manifold 900 that can facilitate fluid communication between layer 600, and/or layer 200, and the microfluidic chip in accordance with one or more embodiments described herein. Repetitive description of like elements employed in other embodiments described herein is omitted for sake of brevity. The interface manifold 900 can comprise one or more waste ports 902, one or more sample inlet ports 904, one or more buffer inlet ports 906, one or more particle outlet ports 908, one or more first particle reservoirs 910, and/or one or more second particle reservoirs 912.

The interface manifold 900 can be located on a separate layer of a microfluidic chip than layer 600 (e.g., or layer 200). The one or more waste ports 902 can be in fluid communication with the one or more waste outlets 210 and can receive waste exiting layer 600 (e.g., and/or layer 200) via the one or more waste outlets 210. The one or more sample inlet ports 904 can be in fluid communication with the one or more sample inlets 202 and can supple a sample fluid to layer 600 (e.g., and/or layer 200) via the one or more sample inlets 202. The one or more buffer inlet ports 906 can be in fluid communication with the one or more buffer inlets 204 and can supply a buffer fluid to layer 600 (e.g., and/or layer 200) via the one or more buffer inlets 204. The one or more particle outlet ports 908 can be in fluid communication with the one or more particle outlets 214 and can receive particles (e.g., exosomes) exiting layer 600 (e.g., and/or layer 200) via the one or more particle outlets 214. The one or more first particle reservoirs 910 can be in fluid communication with the one or more array outlets 702 and can receive particles of a first size exiting layer 600 via the one or more array outlets 702. The one or more second particle reservoirs 912 can be in fluid communication with the one or more array outlets 802 and can receive particles of a second size exiting layer 600 via the one or more array outlets 802. The interface manifold 900 can further comprise one or more o-rings (e.g., one or more gaskets and/or the like) to facilitate one or more seals between layer 600 (e.g., and/or layer 200) and the interface manifold 900 and/or provide structural support for layer 600 (e.g., and/or layer 200).

FIG. 10 illustrates a flow diagram of an example, non-limiting method that can facilitate purification and/or fractionation of a sample fluid via a microfluidic chip that can comprise one or more condenser arrays 100 in accordance with one or more embodiments described herein. Repetitive description of like elements employed in other embodiments described herein is omitted for sake of brevity.

At 1002, the method 1000 can comprise receiving a buffer solution and a sample solution at a microfluidic chip comprising a condenser array 100, an inlet (e.g., sample inlet 202, buffer inlet 204, and/or inlet bus 206), and an outlet (e.g., waste outlet 210, outlet bus 212, and/or particle outlet 214), wherein the sample solution can comprise a sample and waste, and wherein the buffer solution and the sample solution can flow through the condenser array 100 at a rate greater than about 1.0 nanoliters per hour. For example, the buffer solution and the sample solution can flow through the condenser array 100 at a rate greater than or equal to about 1.0 nL/hr and less than or equal to about 5 mL/hr.

At 1004, the method 1000 can comprise displacing, by the condenser array 100, a sample from the sample solution in a direction lateral to a side wall of the microfluidic chip. For example, the sample can be displaced into the buffer solution. At 1006, the method 1000 can comprise collecting the sample separate from the waste via the outlet.

In one or more embodiments, the method 1000 can further comprise pre-filtration and/or dilution of the sample solution, and/or pre-wetting the microfluidic chip with antifouling chemical agents including, but not limited to: buffers of varying pH and ionic strength, surfactants, and/or biological coating agents such as bovine serum albumin ("BSA").

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving a buffer solution and a sample solution at a microfluidic chip comprising a condenser array fluid communication with an inlet and a plurality of outlets, the condenser array coupled between the inlet and the plurality of outlets, wherein the condenser array comprises a lattice structure and a collection channel, wherein the lattice structure is in fluid communication with a first outlet of the plurality of outlets and is defined a plurality of pillars arranged in a plurality of columns, wherein the collection channel is in fluid communication with a second outlet of the plurality of outlets, wherein the sample solution comprises a sample and waste, wherein the buffer solution and the sample solution flow through the condenser array at a rate greater than about 1.0 nanoliters per hour;
   displacing, by the condenser array, the sample from the sample solution in a direction lateral to a side wall of the microfluidic chip, wherein the sample is displaced into the buffer solution; and
   collecting the sample separate from the waste via the outlet.

2. The method of claim 1, wherein the condenser array is selected from a group consisting of a microscale condenser array and a mesoscale condenser array.

3. The method of claim 2, wherein the condenser array comprises a plurality of pillars that define a lattice, wherein a first ratio is less than or equal to a first defined value.

4. The method of claim 3, wherein the first ratio is characterized by $D_x/D_y$, wherein $D_x$ represents a first distance across the lattice in a first direction, and wherein $D_y$ represents a second distance across the lattice in a second direction.

5. The method of claim 4, wherein the first direction is orthogonal to the second direction.

6. The method of claim 4, wherein a second ratio is greater than a second defined value, the second ratio characterized by $D_0/D_y$, and wherein $D_0$ represents a diameter of the plurality of pillars.

7. The method of claim 3, wherein the first defined value is about 1.0, and wherein the second defined value is about 0.5.

8. The method of claim 2, wherein the receiving the buffer solution and the sample solution to the microfluidic chip is pressure driven.

9. The method of claim 4, further comprising fractionizing the sample via a nanoscale deterministic lateral displacement array.

* * * * *